(12) United States Patent
Mori et al.

(10) Patent No.: US 8,948,987 B2
(45) Date of Patent: Feb. 3, 2015

(54) CONTROL DEVICE FOR VEHICLE

(75) Inventors: Tomoya Mori, Zama (JP); Junso Ichiba, Fujisawa (JP); Shinichi Kobayashi, Zama (JP); Yayoi Okumura, Ebina (JP); Tomohiko Takahashi, Isehara (JP); Masashi Ono, Sagamihara (JP); Keisuke Hamano, Sagamihara (JP); Masayuki Tomita, Fujisawa (JP); Toshiya Kouno, Zama (JP); Ritsuo Satou, Atsugi (JP); Hirokimi Koyama, Kanagawa (JP); Toshio Takahata, Atsugi (JP); Masayuki Shimizu, Yokohama (JP); Yuuichi Iriya, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 3 days.

(21) Appl. No.: 13/818,082

(22) PCT Filed: Aug. 9, 2011

(86) PCT No.: PCT/JP2011/068145
§ 371 (c)(1),
(2), (4) Date: Feb. 20, 2013

(87) PCT Pub. No.: WO2012/029513
PCT Pub. Date: Mar. 8, 2012

(65) Prior Publication Data
US 2013/0151091 A1    Jun. 13, 2013

(30) Foreign Application Priority Data
Sep. 1, 2010 (JP) .................................. 2010-195252

(51) Int. Cl.
*G06F 7/00* (2006.01)
*F16H 63/50* (2006.01)
(Continued)

(52) U.S. Cl.
CPC .............. *F16H 63/50* (2013.01); *F02D 41/021* (2013.01); *F02D 41/042* (2013.01); *F02D 41/064* (2013.01); *F02D 41/3029* (2013.01); *F02D 2250/41* (2013.01)
USPC .......................................................... 701/54

(58) Field of Classification Search
USPC .......................................................... 701/54
See application file for complete search history.

(56) References Cited

U.S. PATENT DOCUMENTS

| 6,095,116 A | 8/2000 | Matsushita et al. |
| 2002/0067072 A1* | 6/2002 | Mizutani et al. ........... 303/114.3 |

(Continued)

FOREIGN PATENT DOCUMENTS

| JP | 10-151970 A | 6/1998 |
| JP | 11-050875 A | 2/1999 |

(Continued)

*Primary Examiner* — James Trammell
*Assistant Examiner* — Michael D Lang
(74) *Attorney, Agent, or Firm* — Foley & Lardner LLP (57) ABSTRACT

An internal combustion engine 1 at a standstill of a vehicle after cold starting can switch its combustion mode to a homogenous combustion mode or a stratified combustion mode. An operation range of the stratified combustion at the standstill of the vehicle after cold starting is expanded relative to an operation range of the homogenous combustion at the standstill of the vehicle after cold starting as an inclination of the vehicle decreases. With this technique, the operation range of the stratified combustion can be expanded while assuring an intake air negative pressure required for achieving the brake performance, so that HC reduction at the standstill of the vehicle after cold starting is obtained.

14 Claims, 5 Drawing Sheets

(51) Int. Cl.
*F02D 41/02* (2006.01)
*F02D 41/04* (2006.01)
*F02D 41/06* (2006.01)
*F02D 41/30* (2006.01)

(56) References Cited

U.S. PATENT DOCUMENTS

2003/0164643 A1* 9/2003 Tamura ................. 303/114.3
2004/0216714 A1 11/2004 Tayama et al.
2005/0086930 A1* 4/2005 Akagi et al. ............... 60/285

FOREIGN PATENT DOCUMENTS

| JP | 2000-274274 A | 10/2000 |
| JP | 2004-332552 A | 11/2004 |
| JP | 2006-037907 A | 2/2006 |
| JP | 2006-083830 A | 3/2006 |
| JP | 2009-133225 A | 6/2009 |

* cited by examiner

CONTROL DEVICE FOR VEHICLE

TECHNICAL FIELD

The present invention relates to a control device of a vehicle equipped with an internal combustion engine that at a standstill of the vehicle after cold starting can change its combustion mode to a stratified combustion, a lean burn combustion or a homogeneous combustion.

BACKGROUND ART

Hitherto, a brake device equipped with a booster for lightening a brake pedal depression with the aid of vacuum produced by the internal combustion engine has been widely known.

When, after taking the homogenous combustion by providing engine cylinders with a homogenous air/fuel mixture, the internal combustion engine of the vehicle is switched to take the stratified combustion by feeding the surrounding of ignition plugs with a richer air/fuel mixture, it becomes necessary to largely open the throttle valve for taking much larger air than that in case of the homogeneous combustion, so that under the stratified combustion, the vacuum produced by the internal combustion engine is lowered (viz., approaching the atmospheric pressure).

For example, in Patent Document 1, there is disclosed a technology in which when, in case of obtaining a vacuum for use as a power source for the booster, a desired value of a braking force is equal to or lower than a predetermined value, switching from the stratified combustion to the homogenous combustion is inhibited.

The technology of Patent Document 1 is based on the premise that the magnitude of the braking force is determined in accordance with a vehicle speed, and thus, when the vehicle speed is high, judgment is so made as to need a higher braking force. When the vehicle is running on an upslope, reduction of the vehicle speed inevitably takes place, and thus, as the gradient of the upslope increases, judgment is so made that a larger braking force is not needed. In Patent Document 1, there is also disclosed such a technology that a judgment level of the braking force may be varied in accordance with the inclination of a road surface.

However, in the technology disclosed by Patent Document 1, even when, with the vehicle being at a standstill on an inclined road, the judging level of the braking force is controlled to vary in accordance with the inclination of the road surface, the magnitude of the braking force is forced to be judged based on the vehicle speed, and thus, there is the possibility that a desired braking force is not obtained at a standstill of the vehicle. In other words, when, in the technology of Patent Document 1, a vehicle is at a standstill on an inclined road, there is such a possibility that the switching between the stratified combustion and the homogenous combustion is not appropriately made in the engine.

In view of the above, in the present invention, when a vehicle is at a standstill after cold starting and thus the catalyst in an exhaust gas purifying device installed in an exhaust passage of the engine is not sufficiently activated, a control is so made that an operation range of the stratified combustion at a standstill after cold starting is increased in accordance with an inclination (viz., inclination angle) of the vehicle to suppress an unnecessarily frequent homogenous combustion for the purpose of obtaining a vacuum led to a brake booster to lighten the brake pedal depression.

PRIOR ART DOCUMENT

Patent Document

Patent Document 1: Japanese Laid-open Patent Application (Tokkaihei) 11-50875

SUMMARY OF INVENTION

A control device of a vehicle according to the present invention is applied to an internal combustion engine that is mounted on a vehicle and at a standstill of the vehicle after cold starting, can change its combustion mode to a homogenous combustion, a stratified combustion or a lean burn combustion, and due to operation of the control device, as an inclination of the vehicle decreases, an operation range of the stratified combustion or the lean burn combustion at a standstill of the vehicle after cold starting is expanded relative to an operation range of the homogenous combustion at a standstill of the vehicle after cold starting.

In accordance with the invention, the operation range of the stratified combustion or the lean burn combustion at a standstill of the vehicle after cold starting is expanded depending on the inclination of the vehicle, and thus, the operation range of the stratified combustion or the lean burn combustion can be expanded while assuring the intake air negative pressure required for achieving the brake performance and thus HC reduction at a standstill of the vehicle after cold starting is achieved.

EMBODIMENTS FOR CARRYING OUT INVENTION

Figure 1:
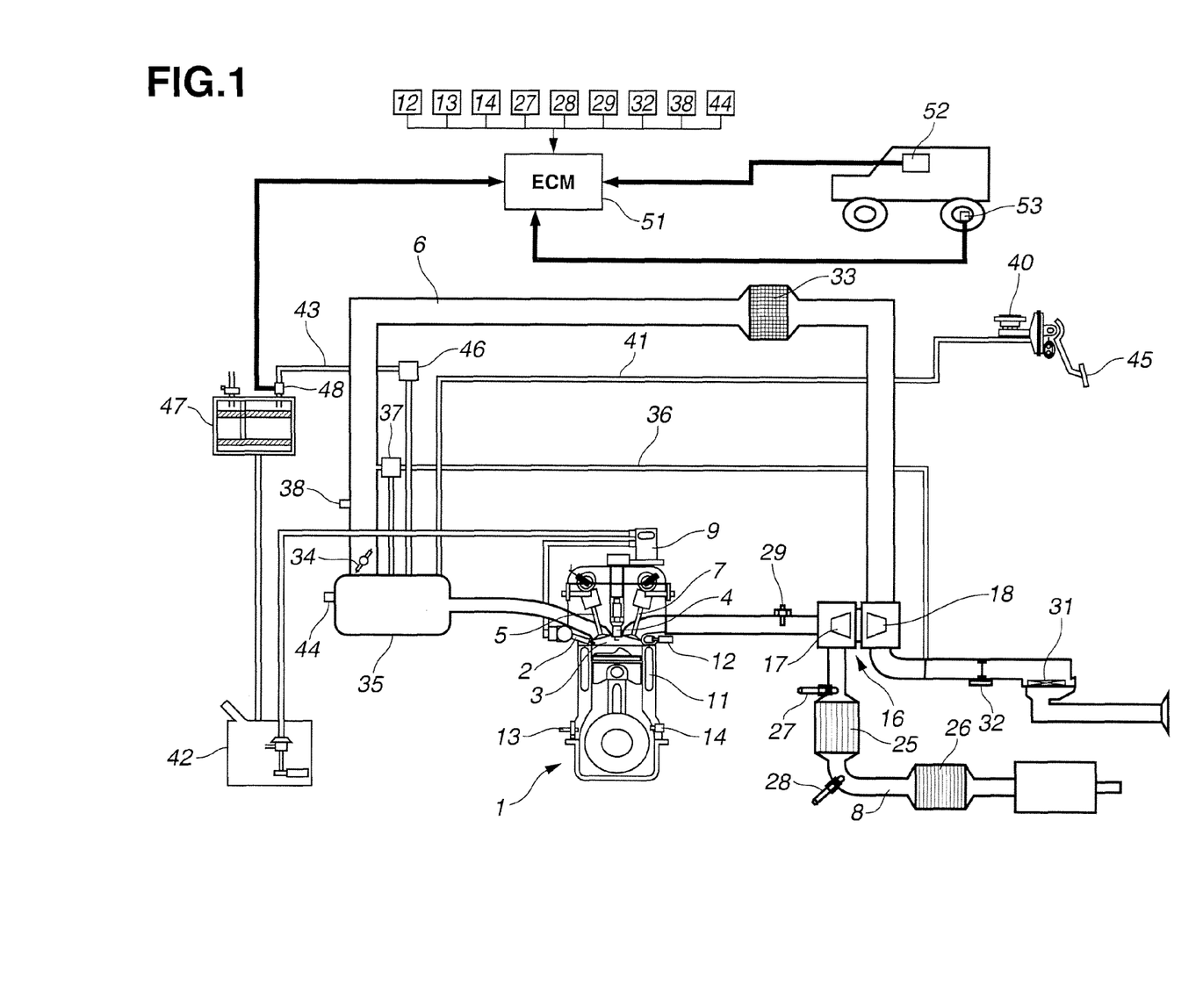
FIG. 1 is an illustration schematically showing a system configuration of an internal combustion engine to which the present invention is practically applied.

In the following, an embodiment of the present invention will be described in detail with reference to the accompanying drawings. FIG. 1 is an illustration schematically showing a system configuration of an internal combustion engine (engine) 1 to which the present invention is practically applied.

Internal combustion engine 1 is of a direct injection type that directly injects fuel into a combustion chamber 3 by using a fuel injection valve 2, and the fuel injected to combustion chamber 3 is ignited by an ignition plug 4. To combustion chamber 3, there are connected intake and exhaust passages 6 and 8 through intake and exhaust valves 5 and 7 respectively. To fuel injection valve 2, there is fed a high pressure fuel by a high pressure fuel pump 9.

To internal combustion engine 1, there are connected a water temperature sensor 12 that detects a temperature of cooling water flowing in a water jacket 11, an oil temperature sensor 13 that detects a temperature of an engine oil and a crankshaft position sensor 14 that detects a rotation speed of internal combustion engine 1.

Internal combustion engine 1 is equipped with a supercharger 16 that has an exhaust turbine 17 and a compressor 18 mounted on a common shaft. Supercharger 16 is constructed to feed a supercharged pressure suitable for an operation condition by adjusting an opening degree of a waste gate valve (not shown).

In exhaust passage 8 arranged downstream of exhaust turbine 17, there are arranged two three-way catalytic converters 25 and 26 in tandem. Three-way catalytic converters 25 and 26 are of a device that exhibits a maximum converting efficiency in NOx, HC and CO at the same time when the air/fuel ratio is within a window that has a theoretical air/fuel ratio in center position. At a position upstream of three-way catalytic converter 25, there is arranged an A/F sensor 27 that detects an exhaust air/fuel ratio, and between three-way catalytic converter 25 and the other three-way catalytic converter 26, there is arranged an oxygen sensor 28. Furthermore, in exhaust passage 8 arranged upstream of exhaust turbine 17, there is arranged an exhaust gas temperature sensor 29 that detects a temperature of the exhaust gas. The A/F sensor 27 is of a wide area type air/fuel ratio sensor that shows a generally linear output characteristic in accordance with the exhaust air/fuel ratio, and the oxygen sensor 28 is a sensor that detects only rich or lean state of the air/fuel ratio while outputting a voltage changing in ON/OFF manner in a limited range near the theoretical air/fuel ratio.

Intake passage 6 is equipped with an air cleaner 31, and downstream of the air cleaner, there are arranged an air flow meter 32 that detects air flow amount, compressor 18 of the above-mentioned supercharger 16, an intercooler 33 that cools the heated air that has been supercharged, a throttle valve 34 and an intake air collector 35. To intake passage 6, there is connected a bypass passage 36 that bypasses compressor 18. To bypass passage 36, there is connected a recirculation valve 37 that conducts recirculation of the supercharged air.

Designated by numeral 38 in FIG. 1 is an intake air pressure sensor that is connected to intake passage 6 to detect an intake air pressure (viz., intake air negative pressure) appearing between intercooler 33 and throttle valve 34. Air flow meter 32 is of a type that has a temperature sensor installed therein and thus it is able to detect a temperature of intake air flowing in the intake passage upstream of compressor 18.

To intake air collector 35 arranged downstream of throttle valve 34, there are connected a negative pressure induction passage 41 that feeds a negative pressure to a brake booster 40 that uses the negative pressure as a boosting power and a purging passage 43 that induces a vaporized fuel produced in a fuel tank 42. To intake air collector 35, there is connected an intake air temperature sensor 44 that detects a temperature of the intake air flowing in the intake passage downstream of inter cooler 33.

Brake booster 40 is a device for lightening the brake pedal depression, which boosts the brake pedal depressing force with the aid of the intake air negative pressure produced by intake air collector 35.

Purging passage 43 has a purging control valve 46 installed therein. To purging passage 43, there is connected a canister 47 for treating the vaporized fuel gas produced in fuel tank 42. Purging control valve 46 is controlled, for example, to increase the purging flow rate of the vaporized fuel gas with increase of an intake air flow rate.

To a purging port of canister 47 to which purging passage 43 is connected, there is connected a pressure sensor 48 that detects a pressure in the purging port, an internal pressure of purging passage 43, namely an internal pressure of purging passage 43, and in the embodiment, the atmospheric pressure is detected by using a detected value of pressure sensor 48. Furthermore, in the embodiment, the detected value of pressure sensor 48 is inputted to ECM (viz., engine control module) 51, and based on the detected value of pressure sensor 48, ECM 51 calculates the altitude of the position where the vehicle is placed. In case like in the embodiment, internal combustion engine 1 equipped with supercharger 16 requires reading of the atmospheric pressure and thus the engine 1 has in addition to pressure sensor 48 connected to purging passage 43 an atmospheric pressure sensor (not shown) that detects the atmospheric pressure, it is possible to estimate the altitude of the position by processing the detected value of the pressure sensor.

EMC 51 has a microcomputer installed therein and carious out various controls for internal combustion engine 1 and makes treatment based on signals from various sensors. In the embodiment, to EMC 51, there are inputted, besides the signal from the above-mentioned pressure sensor 48, signals from an acceleration sensor 52 that detects a longitudinal inclination of the vehicle and a rotary encoder type vehicle speed sensor 53 that detects a vehicle speed and a vehicle starting and various signals from the above-mentioned water temperature sensor 12, oil temperature sensor 13, crankshaft position sensor 14, air flow meter 32, intake air pressure sensor 38, intake air temperature sensor 44, exhaust gas temperature sensor 29, A/F sensor 27 and oxygen sensor 28. If desired, the longitudinal inclination of the vehicle may be estimated from navigation information in place of the signal from acceleration sensor 52.

Due to work of ECM 51, switching is carried out between two combustion modes in accordance with an operation condition. One of the two combustion modes is a stratified combustion mode in which by injecting fuel into a cylinder during the compression stroke, a richer air/fuel mixture is produced around an ignition plug and ignited, and the other of the two combustion modes is a homogeneous combustion mode in which by injecting fuel to the cylinder during the intake stroke, the fuel is diffused to produce a homogenous air/fuel mixture and the mixture is ignited. In order to provide the stratified combustion with a torque equal to that provided by the homogeneous combustion, injection quantity in the stratified combustion is generally same as that in the homogeneous combustion, and by increasing the throttle valve opening under the homogenous combustion, the combustion becomes overall lean. Since, under homogenous combustion, the throttle valve is largely opened, the pumping loss is reduced and thus the homogenous combustion is advantageous in a fuel combustion.

In the embodiment, by the work of brake booster 40 that uses the intake air negative pressure as a boosting power, the depression of brake pedal 45 is assisted, and thus, if the intake air negative pressure is low (that is, the pressure changes in a direction to approach the atmospheric pressure), uncomfortable feeling attacks the driver when he or she depresses brake pedal 45, and in some cases, there is the possibility that the desired braking force is obtained only when the driver depresses brake pedal 45 with a much stronger power. Accordingly, it is necessary to ensure keeping a certain amount of intake air negative pressure. It is to be noted that in this specification, reduction of the intake air negative pressure means that the intake air negative pressure changes in a direction to approach the atmospheric pressure.

The braking force required for stopping the vehicle at the time when the engine is started varies depending on the place where the vehicle is placed. For example, in case of a vehicle parking on a sloping road, the braking force required for stopping the vehicle increases as the inclination of the sloping road increases.

In the stratified combustion that carries out a substantially lean combustion by forming a stratified air/fuel mixture in combustion chamber 3, it is necessary to take in a large amount of air by largely opening the throttle valve as compared with the homogeneous combustion that forms a homogenous air/fuel mixture in combustion chamber 3, and thus, the intake air negative pressure becomes relatively lowered. That is, in case of the stratified combustion, the intake air negative pressure is lowered as compared with the homogenous combustion, and thus, it is impossible to provide brake booster 40 with a negative pressure that can be obtained in the homogenous combustion.

While, in order to improve the exhaust performance at the time of cold starting, it is desirable to carry out the stratified combustion that is a leaner combustion than the homogenous combustion.

Accordingly, in the embodiment, a control is so made that at a standstill of the vehicle after cold starting, the operation range of the stratified combustion at a standstill of the vehicle is increased in accordance with the inclination (gradient) of the vehicle, so that HC reduction and increase of the low temperature activation of three-way catalytic converters 25 and 26 at a standstill of the vehicle after cold starting are achieved by increasing the operation range of the stratified combustion while ensuring the intake air negative pressure required for achieving the braking performance.

In the embodiment, for judging whether the vehicle is at a standstill or not, the detected signal from vehicle speed sensor 53 is used for detecting start of movement of the vehicle, that is, for detecting whether the vehicle has started or not. The judgment for detecting whether the vehicle has started or not may be carried out after the detected signal from vehicle speed sensor 53 is converted to the vehicle speed. However, as compared with this method, the other method in which the start of movement of the vehicle is judged from the detected signal from vehicle speed sensor 53 is preferable because of its increased judgment accuracy as compared with the judgment based on the vehicle speed, that is, because the error is small even though the measuring system is the same.

Figure 2:
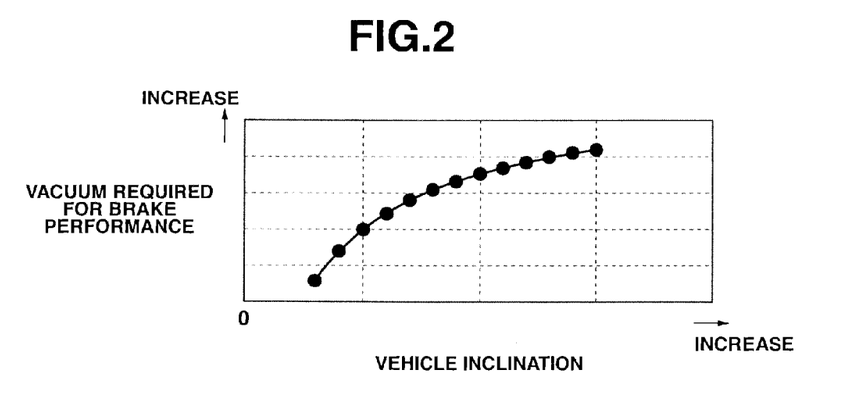
FIG. 2 is an illustration depicting a correlation between a vacuum required for achieving the brake performance and an inclination of a vehicle.

The correlation between the intake air negative pressure required for achieving the braking performance and the inclination (viz., inclination angle) of the vehicle at the time when internal combustion 1 starts its operation has such a tendency that as is seen from FIG. 2, the intake air negative pressure required for achieving the braking performance lowers as the inclination of the vehicle lowers. This is because as the inclination of the vehicle increases, that is, as the inclination of the slope where the vehicle is at a standstill increases, a force that urges to move the vehicle downward along the slope is increased. That is, at a standstill of the vehicle, as the inclination of the vehicle increases, the vehicle requires a higher braking force and thus the intake air negative pressure needed is higher.

Furthermore, since the intake air negative pressure is affected by the external environment where the vehicle is at a standstill, the intake air negative pressure is lowered as the altitude increases even under the same throttle open degree and engine speed.

Accordingly, in the embodiment, a setting is so made that when the engine 1 is under operation after cold starting, the operation range of the stratified combustion at a standstill of the vehicle after cold starting is expanded relative to the operation range of the homogenous combustion at a standstill of the vehicle after cold staring.

That is, in the embodiment, at a standstill of the vehicle after cold starting, the stratified combustion is carried out in a range (viz., the range that causes the driver not to feel hard brake depression when, under the stratified combustion, he or she depresses brake pedal 45) that, even at a standstill of the vehicle after cold starting, exhibits the braking performance without providing the driver with uncomfortable feeling by the intake air negative pressure produced under the stratified combustion mode, and the homogenous combustion is carried out in a range that, upon braking operation made by the driver (that is, when he or she depresses brake pedal 45), causes the driver to feel hard brake depression due to insufficient feeding of the intake negative pressure to brake booster 40 under the stratified combustion.

The above will be described in detail hereinnext. That is, as is seen from FIG. 3, as the inclination of the vehicle decreases and/or the altitude reduces, the operation range of the stratified combustion at a standstill of the vehicle after cold starting is expanded relative to the operation range of the homogenous combustion at the standstill of the vehicle after cold starting.

Figure 3:
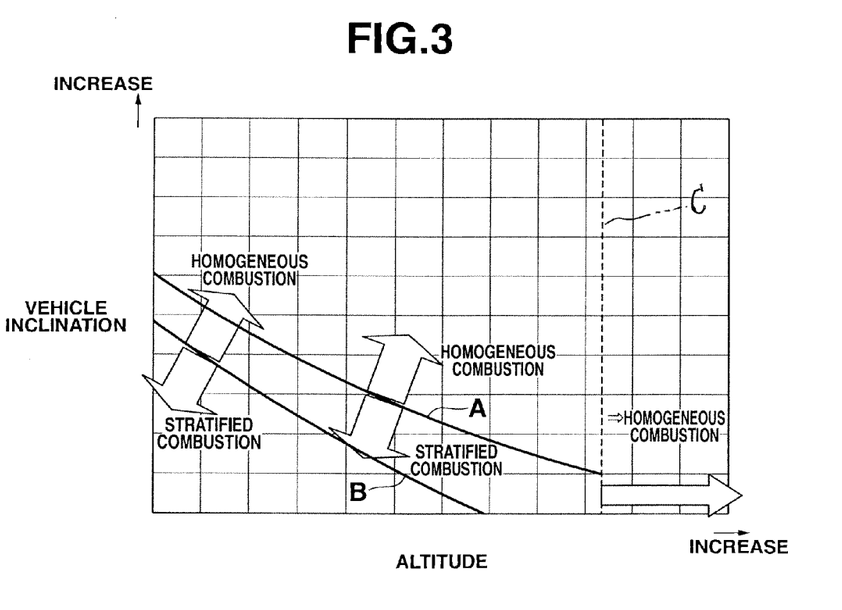
FIG. 3 is an illustration depicting schematically a stratified combustion range and a homogenous combustion range at a standstill of a vehicle after cold starting, which ranges are controlled by a control device of a vehicle according to the present invention.

With such operation range, an intake negative pressure with which the driver can depress brake pedal 45 without suffering from uncomfortable feeling is constantly obtained, and thus, the driver who operates brake pedal 45 is permitted to depress brake pedal 45 in a regular brake depressing way and thus he or she can operate brake pedal 45 without feeling uncomfortable.

As the altitude increases, the intake air negative pressure produced by internal combustion engine 1 is reduced, and thus, by changing the operation range of the stratified combustion at a standstill of the vehicle after cold starting in accordance with the altitude, it is possible to obtain an intake air negative pressure of the amount that assures the braking performance required for the standstill of the vehicle after cold starting.

Furthermore, in the embodiment, when, with the vehicle being at a standstill after cold starting, the engine rotation speed is equal to or higher than a predetermined rotation speed (for example, 950 rpm) (see the characteristic curve A of FIG. 3), the operation range of the stratified combustion at the standstill of the vehicle after cold starting is expanded relative to the operation range of the homogenous combustion at the standstill of the vehicle after cold starting as compared with a case in which the engine rotation speed is lower than the predetermined speed (for example, 950 rpm) (see the characteristic curve B of FIG. 3). That is, the operation range of the stratified combustion is varied in accordance with the engine rotation speed at the standstill of the vehicle after cold starting. In other words, when the engine rotation speed is equal to or higher than the predetermined speed, the operation range of the stratified combustion is determined by using the characteristic curve A that represents a threshold value for a higher rotation speed, and when the engine rotation speed is lower than the predetermined speed, the operation range of the stratified combustion is determined by using the characteristic curve B that represents a threshold value for a lower rotation speed.

Values of the predetermined speeds are those that are set in accordance with an internal combustion engine and a transmission that are mounted on the vehicle, and if for example the transmission is an automatic transmission, the predetermined rotation speed is so set that when, with the vehicle being at a standstill after cold starting, the engine rotation speed is equal to or higher than the predetermined rotation speed, the select lever of the automatic transmission takes N-range or P-range, and when, with the vehicle being at a standstill after cold starting, the engine rotation speed is lower than the predetermined rotation speed, the select lever of the automatic transmission takes D-range or R-range.

Under a condition wherein the select lever of the automatic transmission takes D-range or R-range, that is, under a condition wherein a creep torque is produced, there is a force that urges the vehicle to move, and thus, the intake air negative pressure to be obtained at the standstill wherein the creep torque is produced is higher than the intake air negative pressure to be obtained at the other standstill wherein the creep torque is not produced.

Accordingly, like in the embodiment, by setting the predetermined rotation speed of the engine in such a manner as to change the operation range of the stratified combustion at a standstill of the vehicle after cold starting depending on whether a creep torque is produced or not, it becomes possible to obtain an intake air negative pressure required for achieving the brake performance at a standstill of the vehicle after cold starting.

Figure 4:
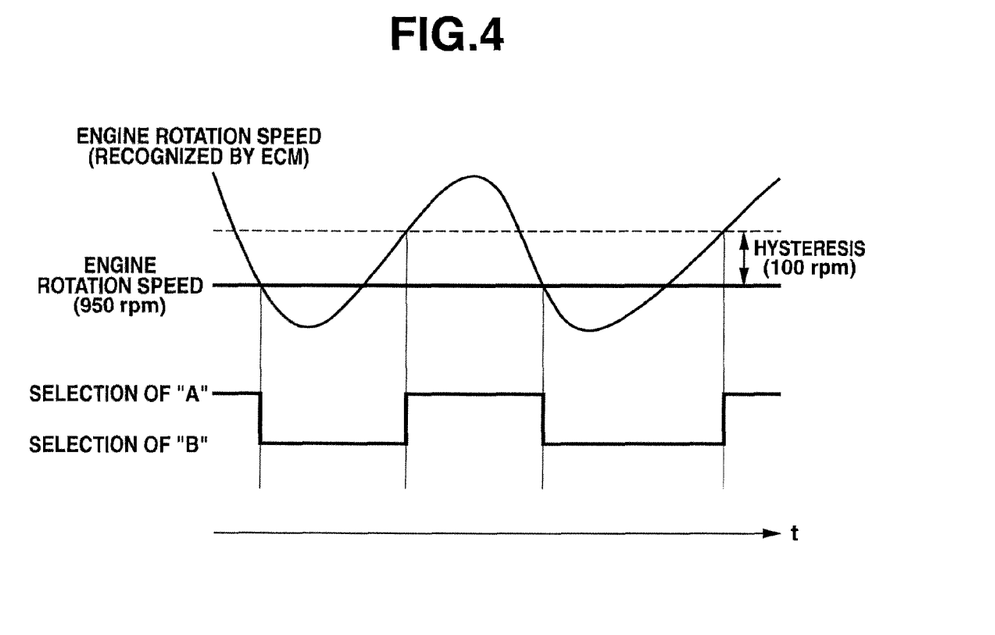
FIG. 4 is an illustration schematically depicting one example of switching between a threshold value for a high rotation speed and a threshold value for a low rotation speed.

Regarding selection of the characteristic curve A that represents a threshold value for a high rotation speed or the characteristic curve B that represents a threshold value for a low rotation speed, it is possible to make an instant switching between the two curves at the time when the engine rotation speed becomes lower than the predetermined rotation speed or when the engine rotation speed becomes equal to or higher than the predetermined rotation speed. However, as is depicted by FIG. 4, the switching between the characteristic curve A and the other characteristic curve B may be made with reference to a predetermined hysteresis. That is, as is seen from FIG. 4, at the time of making the switching between the characteristic curve A and the characteristic curve B, a setting may be so made that when, with the characteristic curve A being selected, the engine rotation speed becomes lower than the predetermined rotation speed, the switching from the characteristic curve A to the characteristic curve B is instantly made, while at the time of making switching from the characteristic curve B to the characteristic curve A, the switching from the characteristic curve B to the characteristic curve A is made at the timing when the engine rotation speed becomes higher than the predetermined rotation speed by a speed corresponding a predetermined hysteresis (for example, 100 rpm).

Furthermore, in the embodiment, in case where the vehicle is at an altitude where the intake air negative pressure required for achieving the brake performance is obtained only by the homogeneous combustion, in other words, when the vehicle is at an altitude higher than the predetermined altitude, the combustion of the engine after cold starting is set to the homogeneous combustion irrespective of the inclination of the vehicle and the engine rotation speed. That is, when the altitude is shown by a right side region of the straight dotted line C of FIG. 3 representing that the current altitude is higher than the predetermined altitude, the control is so made that the homogenous combustion of the engine after cold starting is carried out irrespective of the inclination of the vehicle and the engine rotation speed.

Figure 5:
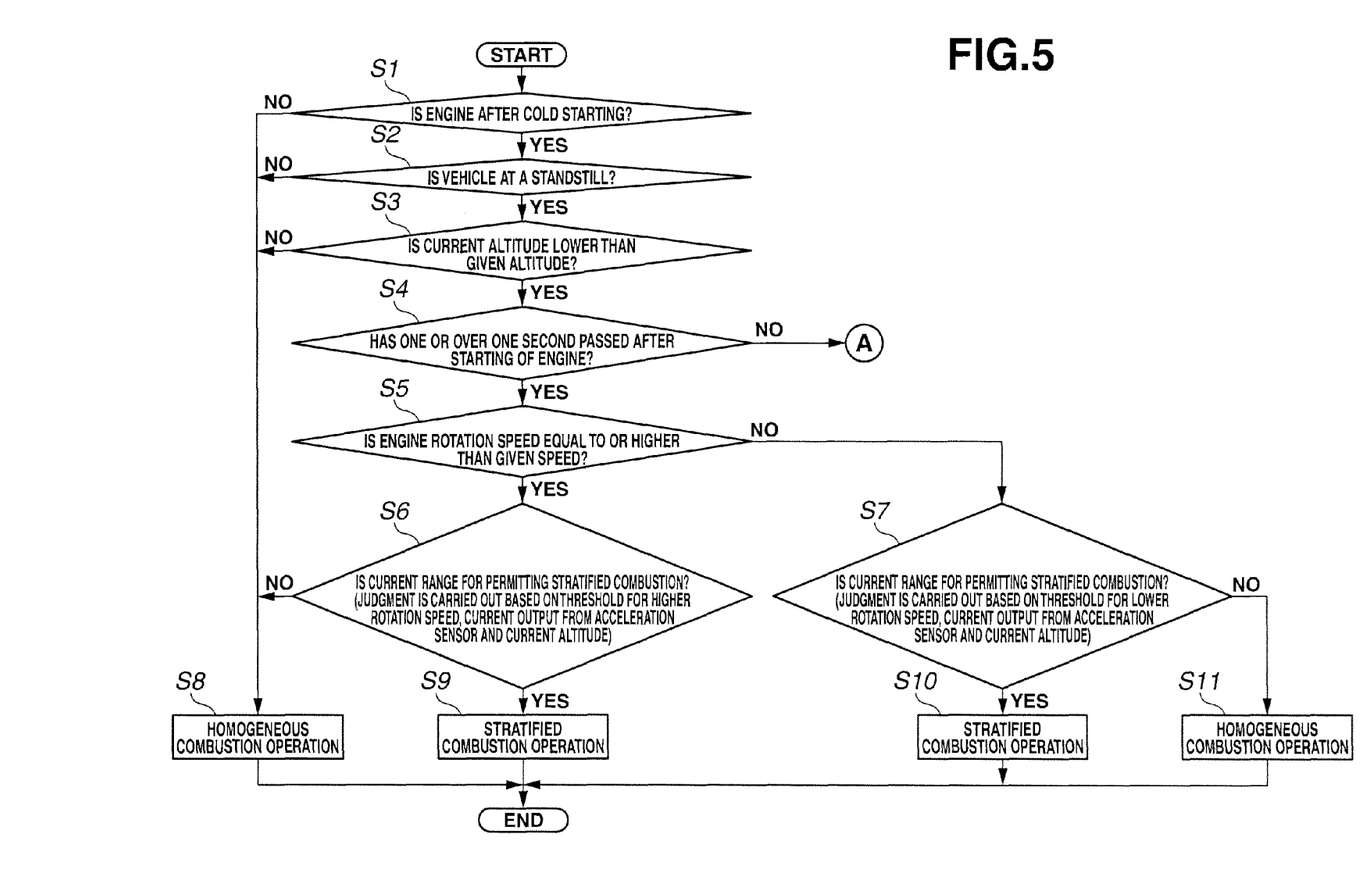
FIG. 5 is a flowchart showing a flow of operation steps executed by the control device of the vehicle of the present invention.
Figure 6:
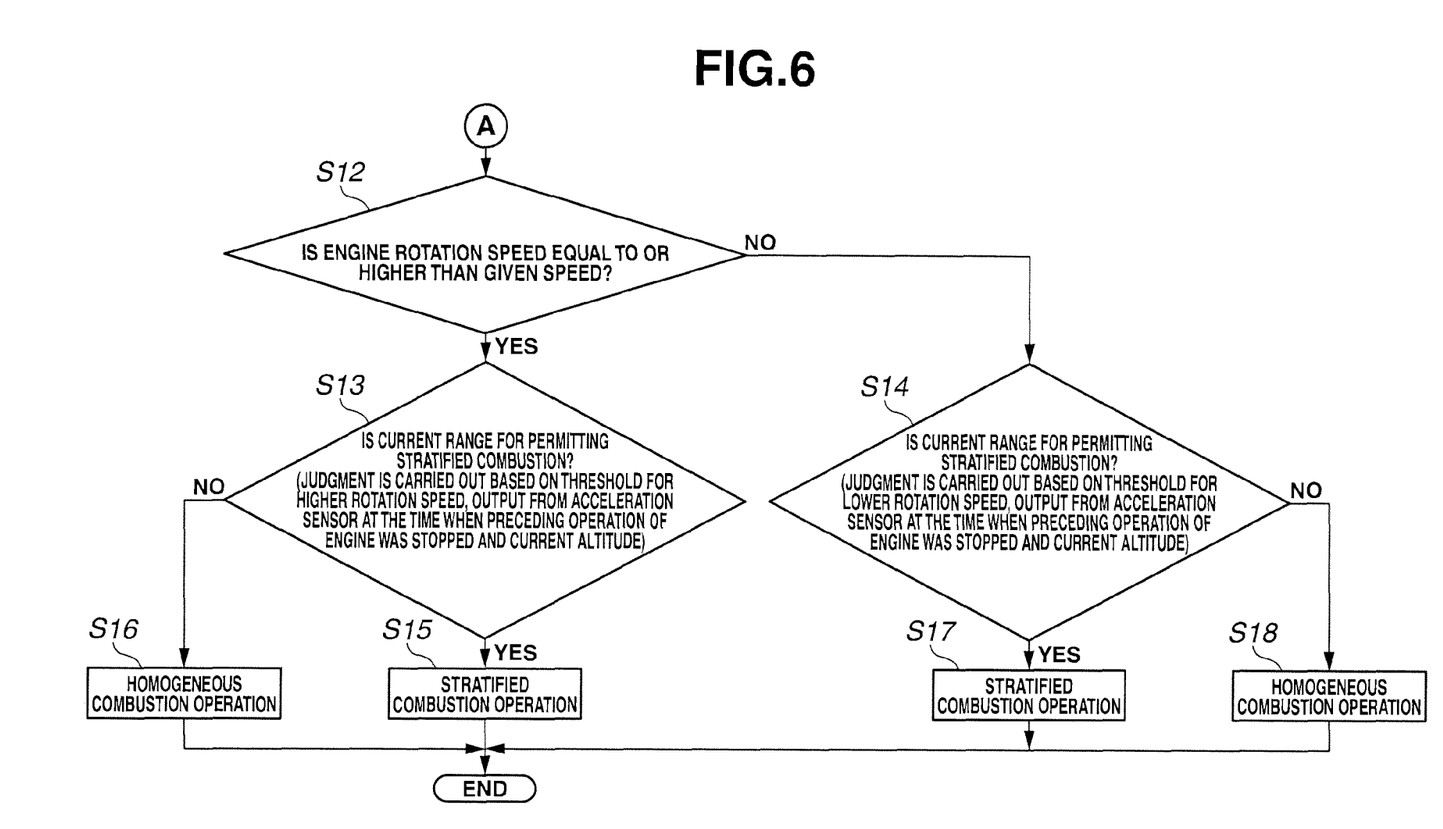
FIG. 6 is a flowchart showing a flow of operation steps executed by the control device of the vehicle of the present invention.

FIGS. 5 and 6 are flowcharts depicting a controlled operation flow of the embodiment, which indicate the process of determining the mode of combustion at the time of cold starting.

At step S1, judgment is carried out as to whether internal combustion engine 1 takes the cold starting or not based on the detected value of water temperature sensor 12, and if internal combustion engine 1 is in a cold condition, the operation flow goes to step S2, and if internal combustion engine 1 is not in the cold condition, the operation flow goes to step S8 causing internal combustion engine 1 to take the mode of homogenous combustion. In a very low temperature condition, internal combustion engine 1 suffers from a considerable friction and thus there is the possibility that the stratified combustion becomes instable. Thus, in such a very low temperature condition that the stratified combustion is unstable due to the cold state of internal combustion engine 1, the homogenous combustion may be selected.

At step S2, judgment is carried out as to whether the vehicle is at a standstill or not based on the detected value of vehicle speed sensor 53, and if the vehicle is at the standstill, the operation flow goes to step S3, and if the vehicle is not at the standstill, the operation flow goes to step S8.

At step S3, judgment is carried out as to whether the current altitude is equal to or lower than a predetermined altitude or not, and if the altitude is equal to or lower than the predetermined altitude, the operation flow goes to step S4, and if the altitude is higher than the predetermined altitude, the operation flow goes to step S8.

At step S4, judgment is carried out as to whether one or over second has passed from the starting of internal combustion engine 1 or not, and if one or over second has passed from the starting (for example, the time when the ignition switch is turned ON) of internal combustion engine 1, the operation flow goes to step S5, and if one or over second has not passed from the starting of internal combustion engine 1, the operation flow goes to step S12. As will be described hereinafter, when the operation flow goes from step S4 to step S5, determination of the mode of combustion of internal combustion engine 1 at a standstill of the vehicle after cold starting is carried out with the aid of the inclination of the vehicle that is calculated from the output of acceleration sensor 52. While, when the operation flow goes from step S4 to step S12, determination of the mode of combustion of internal combustion engine 1 at a standstill of the vehicle after cold starting is carried out with the aid of the inclination of the vehicle that is calculated from the output of acceleration sensor 52 at the time when the engine key is turned OFF, that is, when internal combustion engine 1 enjoying a preceding trip is stopped.

The reason why passage of time from stating of operation of internal combustion engine 1 is checked at step S4 is as follows. Just after starting of operation of internal combustion engine 1, that is, just after energization, acceleration sensor 52 judging the inclination of the vehicle fails to issue a stable output and thus there is the possibility that judgment on the vehicle inclination is not accurately made. Thus, until the time when the output of acceleration sensor 52 becomes stable, the value detected by acceleration sensor 52 at the time when the engine key is turned OFF at a previous time, that is, when internal combustion engine 1 is turned OFF after making the preceding trip is practically used, so that the inclination of the vehicle is accurately detected.

At step S5, judgment is carried out as to whether the engine rotation speed of internal combustion engine 1 is equal to or higher than a predetermined rotation speed or not, if the engine rotation speed is equal to or higher than the predetermined rotation speed, the operation flow goes to step S6, and if the engine rotation speed is lower than the predetermined rotation speed, the operation flow goes to step S7. That is, at step S5, selection is carried out or judged between the characteristic curve A of the threshold value for a higher rotation speed and the characteristic curve B of the threshold value for a lower rotation speed, which are the thresholds used for parting, with the vehicle being at a standstill after cold starting, the combustion mode into a range for the stratified combustion and a range for the homogenous combustion.

Then, at step S6, using the judged results of steps S4 and S5, judgment is carried out as to whether a current operation range of internal combustion engine 1 is the range for permitting the stratified combustion or not from the characteristic curve A of the threshold value for the higher rotation speed, the inclination of the vehicle calculated from the current output of acceleration sensor 52 and the current altitude, and if the operation range is for the stratified combustion, the operation flow goes to step S9 causing internal combustion engine 1 to take the stratified combustion mode, and if not, the operation flow goes to step S8.

Then, at step S7, using the judged results of steps S4 and S5, judgment is carried out as to whether a current operation range of internal combustion engine 1 is the range for permitting the stratified combustion or not from the characteristic curve B of the threshold value for the lower rotation speed, the inclination of the vehicle calculated from the current output of acceleration sensor 52 and the current altitude, and if the operation range is for the stratified combustion, the operation flow goes to step S10 causing internal combustion engine 1 to take the stratified combustion mode, and if not, the operation flow goes to step S11 causing internal combustion engine 1 to take the homogenous combustion mode.

At step S12, judgment is carried out as to whether the rotation speed of internal combustion engine 1 is equal to or higher than the predetermined rotation speed or not, and if the rotation speed of internal combustion engine 1 is equal to or higher than the predetermined rotation speed, the operation flow goes to step S13, and if the rotation speed of internal combustion engine 1 is lower than the predetermined rotation speed, the operation flow goes to step S14. That is, at step S12, selection carried out or judged between the characteristic curve A of the threshold value for a higher rotation speed and the characteristic curve B of the threshold value for a lower rotation speed, which are the thresholds used for parting, with the vehicle being at a standstill after cold starting, the combustion mode into a range for the stratified combustion and a range for the homogenous combustion.

Then, at step S13, using the judged results of steps S4 and S12, judgment is carried out as to whether a current operation range of internal combustion engine 1 is the range for permitting the stratified combustion or not from the characteristic curve A of the threshold value for the higher rotation speed, the inclination of the vehicle calculated from the output of acceleration sensor 52 at the time when internal combustion engine 1 enjoying a preceding trip is stopped and the current altitude, and if the operation range is for the stratified combustion, the operation flow goes to step S15 causing internal combustion engine 1 to take the stratified combustion mode, and if not, the operation flow goes to step S16.

Then, at step S14, using the judged results of steps S4 and S12, judgment is carried out as to whether a current operation range of internal combustion engine 1 is the range for permitting the stratified combustion or not from the characteristic curve B of the threshold value for the lower rotation speed, the inclination of the vehicle calculated from the output of acceleration sensor 52 at the time when internal combustion engine 1 enjoying a preceding trip is stopped and the current altitude, and if the operation range is for the stratified combustion, the operation flow goes to step S17 causing internal combustion engine 1 to take the stratified combustion mode, and if not, the operation flow goes to step S18 causing internal combustion engine 1 to take the homogenous combustion mode.

It is to be noted that the present invention is applicable to a port-injection type internal combustion engine that can selectively take the homogenous combustion mode and a lean-burn combustion mode provided by opening the throttle valve to produce a lean-combustion. Also this type engine has advantages that are substantially the same as those of the above-mentioned embodiment that can selectively take the homogenous combustion mode and the stratified combustion mode.

In case of applying the present invention to the internal combustion engine that can selectively take the homogenous combustion mode and the lean-burn combustion mode, a control is so made that the operation range of the lean-burn combustion at a standstill of the vehicle after cold starting is expanded relative to the operation range of the homogenous combustion at the standstill of the vehicle after cold starting as the inclination of the vehicle decreases.

Furthermore, in case of applying the present invention to the internal combustion engine that can selectively take the homogenous combustion mode and the lean-burn combustion mode, a control is so made that the operation range of the lean-burn combustion at a standstill of the vehicle after cold staring at the time when the vehicle is on a lower altitude place is expanded relative to the operation range of the homogenous combustion at the standstill of the vehicle after cold staring as compared with a case wherein the vehicle is on a higher altitude place.

Furthermore, in case of applying the present invention to the internal combustion engine that can selectively take the homogenous combustion mode and the lean-burn combustion mode, the operation range of the lean-burn combustion is varied in accordance with the engine rotation speed at the time when the vehicle is at a standstill after cold starting. That is, when, with the vehicle being at a standstill after cold starting, the engine rotation speed is equal to or higher than a predetermined rotation speed (for example, 950 rpm), the operation range of the lean-burn combustion at the standstill of the vehicle after cold starting is expanded relative to the operation range of the homogenous combustion at the standstill of the vehicle after cold starting as compared with a case in which the engine rotation speed is lower than the predetermined rotation speed (for example, 950 rpm).

Like in the above-mentioned embodiment, the predetermined rotation speed is set in accordance with an internal combustion engine and a transmission that are mounted on the vehicle, and the predetermined rotation speed is so set that when, with the vehicle being at a standstill after cold starting, the engine rotation speed is equal to or higher than the predetermined rotation speed, the select lever of the automatic transmission takes N-range or P-range, when, with the vehicle being at a standstill after cold starting, the engine rotation speed is lower than the predetermined rotation speed, the select lever of the automatic transmission takes D-range or R-range. That is, the setting is so made that in case wherein no creep torque is produced in the vehicle, the operation range of the lean-burn combustion at a standstill after cold starting is expanded relative to the operation range of the homogenous combustion at the standstill after cold starting as compared with a case wherein a creep torque is produced in the vehicle.

The invention claimed is:

1. A control device configured to be installed in a vehicle equipped with both an internal combustion engine configured to selectively change a combustion mode of the internal combustion engine to a homogenous combustion, a stratified combustion or a lean-burn combustion and a brake booster powered by an intake air negative pressure produced by the internal combustion engine, the control device comprising:
an inclination detecting means for detecting or estimating an inclination of the vehicle in a front and back direction,
wherein the control device is configured to control the combustion mode of the internal combustion engine at a standstill of the vehicle after cold starting in accordance with the inclination of the vehicle outputted by the inclination detecting means so as to cause the combustion mode of the internal combustion engine to take the stratified combustion or the lean-burn combustion when the inclination of the vehicle is smaller than a threshold value, and to cause the combustion mode to take the homogenous combustion when the inclination of the vehicle is larger than the threshold value.

2. The control device of the vehicle as claimed in claim 1, wherein:
the internal combustion engine is of a direct injection type configured to selectively change the combustion mode to the homogenous combustion or the stratified combustion, and
the control device is configured to cause the combustion mode to take the stratified combustion when the inclination of the vehicle is smaller than the threshold value.

3. The control device of the vehicle as claimed in claim 1, further comprising:
an altitude detecting means for detecting an altitude of a position where the vehicle is placed,
wherein the control device is configured to set the threshold value in accordance with the altitude such that the threshold value becomes smaller as the altitude increases.

4. The control device of the vehicle as claimed in claim 1, wherein:
for a given period after starting of the internal combustion engine, the inclination of the vehicle detected by the inclination detecting means at a time when a preceding operation of the internal combustion engine was stopped is treated as a current inclination of the vehicle.

5. The control device of the vehicle as claimed in claim 4, wherein:
the given period is a period from a time when energization of the inclination detecting means starts to a time when an output of the inclination detecting means becomes stable.

6. The control device of the vehicle as claimed in claim 1, wherein the vehicle is further equipped with an automatic transmission,
wherein the control device is configured to cause the threshold value to take different values between first and second cases in which the vehicle is at a standstill,
wherein, in the first case, the transmission assumes a first range producing a certain creep torque and, in the second case, the transmission assumes a second range producing no creep torque,
wherein a threshold value provided when the certain creep torque is produced is lower than a threshold value provided when no creep torque is produced.

7. The control device of the vehicle as claimed in claim 6, wherein:
based on a rotation speed of the internal combustion engine, the transmission assumes one of the first range that produces the certain creep torque and the second range that produces no creep torque.

8. A control device configured to be installed in a vehicle equipped with both an internal combustion engine configured to selectively change a combustion mode of the internal combustion engine to a homogenous combustion, a stratified combustion or a lean-burn combustion and a brake booster powered by an intake air negative pressure produced by the internal combustion engine, the control device comprising:
an inclination detector configured to detect or estimate an inclination of the vehicle in a front and back direction,
wherein the control device is configured to control the combustion mode of the internal combustion engine at a standstill of the vehicle after cold starting in accordance with the inclination of the vehicle outputted by the inclination detector so as to cause the combustion mode of the internal combustion engine to take the stratified combustion or the lean-burn combustion when the inclination of the vehicle is smaller than a threshold value, and to cause the combustion mode to take the homogenous combustion when the inclination of the vehicle is larger than the threshold value.

9. The control device of the vehicle as claimed in claim 8, wherein:
the internal combustion engine is of a direct injection type configured to selectively change the combustion mode to the homogenous combustion or the stratified combustion, and
the control device is configured to cause the combustion mode to take the stratified combustion when the inclination of the vehicle is smaller than the threshold value.

10. The control device of the vehicle as claimed in claim 8, further comprising:
an altitude detector configured to detect an altitude of a position where the vehicle is placed,
wherein the control device is configured to set the threshold value in accordance with the altitude such that the threshold value becomes smaller as the altitude increases.

11. The control device of the vehicle as claimed in claim 8, wherein, for a given period after starting of the internal combustion engine, the inclination of the vehicle detected by the inclination detector at a time when a preceding operation of the internal combustion engine was stopped is treated as a current inclination of the vehicle.

12. The control device of the vehicle as claimed in claim 11,
wherein the given period is a period from a time when energization of the inclination detector starts to a time when an output of the inclination detector becomes stable.

13. The control device of the vehicle as claimed in claim 8, wherein the vehicle is further equipped with an automatic transmission,
wherein the control device is configured to cause the threshold value to take different values between first and second cases in which the vehicle is at a standstill,
wherein, in the first case, the transmission assumes a first range producing a certain creep torque and, in the second case, the transmission assumes a second range producing no creep torque,
wherein a threshold value provided when the certain creep torque is produced is lower than a threshold value provided when no creep torque is produced.

14. The control device of the vehicle as claimed in claim 13,
wherein, based on a rotation speed of the internal combustion engine, the transmission assumes one of the first range that produces the certain creep torque and the second range that produces no creep torque.

* * * * *